B. KAMINSKY.

WATER FOUNTAIN.

APPLICATION FILED JULY 25, 1910.

Reissued Jan. 10, 1911. 13,195.

WITNESSES:

J. H. Wells

O. M. McLaughlin

INVENTOR.

Bennett Kaminsky.

BY

V. H. Lockwood

ATTORNEY.

UNITED STATES PATENT OFFICE.

BENNETT KAMINSKY, OF INDIANAPOLIS, INDIANA, ASSIGNOR OF ONE-HALF TO JULIUS M. KAMINSKY, OF INDIANAPOLIS, INDIANA.

WATER-FOUNTAIN.

13,195. Specification of Reissued Letters Patent. Reissued Jan. 10, 1911.

Original No. 940,879, dated November 23, 1909, Serial No. 475,997. Application for reissue filed July 25, 1910. Serial No. 573,817.

*To all whom it may concern:*

Be it known that I, BENNETT KAMINSKY, a citizen of the United States, residing at Indianapolis, in the county of Marion and State of Indiana, have invented certain new and useful Improvements in Water-Fountains, of which the following is a specification.

The object of this invention is to provide an absolutely pure and sanitary drinking fountain for schools and other public places.

The chief feature of the invention consists in providing a number of water-discharging nozzles or water outlets facing each other converging in a number of directions so as to concentrate the streams therefrom at one point and preferably at an upward inclination, and free from any interference by any part above the outlets so that at the point of juncture of said streams there will be a geyser-like body of water projected upwardly. The water, after shooting upwardly, drops down and flows away. It is easy for one who desires a drink to apply his mouth to this geyser-like column of water that bubbles up somewhat like a spring. This renders drinking without the use of a cup or dipper very easy and agreeable. There is the pleasure that attends drinking bubbling spring water, and yet it does not dash against the face or otherwise annoy the person while drinking.

The full nature of the invention will be understood from the accompanying drawings and the following description and claims.

Figure 1:
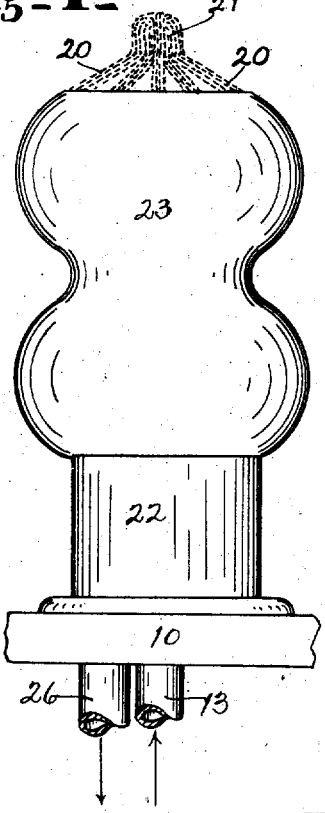
Figure 2:
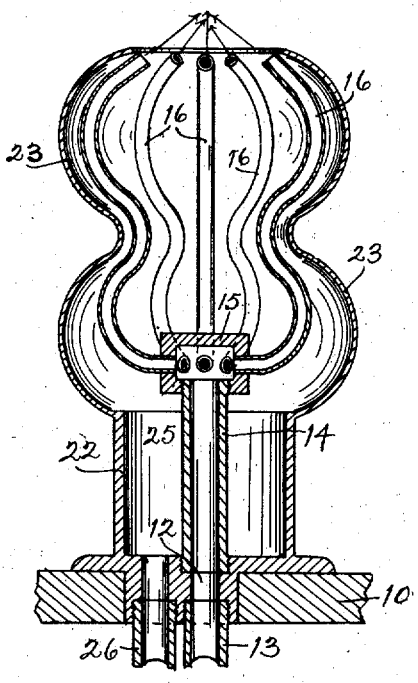
Figure 3:
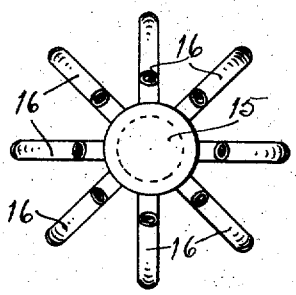

In the drawings Figure 1 is a side elevation of the device in operation. Fig. 2 is a central vertical section. Fig. 3 is a plan view thereof with the upper portion of the casing removed.

In the drawings 10 represents a stand or the like, to which plate 11 is secured, having a threaded aperture 12, through it to receive the water-supply pipe 13. There is a tube 14 that screws into the aperture 12, and said tube extends upwardly and has a closed head 15, from the sides of which nozzles or water outlets 16 extend. There may be any number of these nozzles or water outlets preferably more than two, the number shown being eight located equidistant from each other. They are curved and here extend upwardly, and the outlets are curved inwardly and upwardly and at about equal distances from the central point, those opposite each other being spaced considerably from each other. The outlets of these nozzles are so arranged that they will converge streams of water at a common point, said streams being preferably directed at an inclination upwardly, substantially as shown. The result is that when the streams of water 20 meet, they will throw a geyser-like column of water 21 upwardly for an inch or two, and then the water will drop down and flow away. The plate 11 has a casing 22 extending upwardly from it and concentric with the tube 14 and with a bowl-like portion 23 above, surrounding the nozzles. The top of the portion 23 is open, through which the jets 20 are projected. This portion 23 protects the nozzles and keeps the children or others from coming in contact with them or interfering with them. Therefore, the jets 20 seem to issue from the aperture in the top of the casing 22 and the portion 23. The waste water flows down into the casing 22 through the aperture 25 and out through the waste pipe 26.

The nozzles may be formed as desired, but the double ogee-shape shown in Fig. 2 is preferable, as it tends to retard the violence of the flow of water therethrough and produces a better result than if the flow of water were more direct.

By "nozzles" herein is meant any water discharge outlet or orifice through or from which water is discharged, whether the same be in a tube or projecting nozzle, as herein shown, or the water issues in streams from more than two orifices provided in some other way. While an even number of water discharge outlets are here shown, an odd number may be employed if desired.

I claim as my invention:

1. A drinking fountain including a number of water discharge outlets so arranged that they discharge water in streams converging to produce a solid body of water rising from the point where the streams meet.

2. A drinking fountain including a number of water discharge outlets so arranged that they discharge water in streams converging in more than two directions to produce a solid body of water rising from the point where the streams meet.

3. A drinking fountain including more than two water-discharging nozzles arranged substantially facing each other so as to discharge the water therefrom at an upward inclination and to a single point, whereby a geyser-like jet of water will be thrown upwardly at the point where the streams of water meet.

4. A drinking fountain including more than two nozzles disposed equidistant around a central point with the discharging ends inclined inwardly and upwardly so as to discharge the columns of water against each other at one point, substantially as set forth.

5. The combination of a stand, a water-supply tube extending upwardly therefrom, and more than two nozzles leading laterally from the sides of said tube at its upper end and extending upwardly around a central point with the discharge ends thereof facing each other and turned inwardly and upwardly, substantially as shown.

6. A drinking fountain including an upwardly extending water-supply tube, nozzles extending laterally from the side thereof and extending upwardly around a central point with the discharge portions leading upwardly and inwardly, a casing surrounding said tube and said nozzles and extending above the nozzles and open at the upper end so that streams of water may discharge from the nozzles through said opening and without touching said casing, and an outlet for waste water at the lower end of said casing.

In witness whereof, I have hereunto affixed my signature in the presence of the witnesses herein named.

BENNETT KAMINSKY.

Witnesses:

HAZEL WELLS,

G. H. BOINK.